United States Patent
De Schepper et al.

(10) Patent No.: US 10,425,347 B2
(45) Date of Patent: Sep. 24, 2019

(54) SCHEDULING OF PACKETS IN NETWORK DEVICES

(71) Applicant: Provenance Asset Group LLC, Essex, CT (US)

(72) Inventors: Koen De Schepper, Edegem (BE); Ing-Jyh Tsang, Waasmunster (BE)

(73) Assignee: PROVENANCE ASSET GROUP LLC, Essex, CT (US)

( * ) Notice: Subject to any disclaimer, the term of this patent is extended or adjusted under 35 U.S.C. 154(b) by 0 days.

(21) Appl. No.: 15/553,632

(22) PCT Filed: Mar. 17, 2016

(86) PCT No.: PCT/EP2016/055812
§ 371 (c)(1),
(2) Date: Aug. 25, 2017

(87) PCT Pub. No.: WO2016/150813
PCT Pub. Date: Sep. 29, 2016

(65) Prior Publication Data
US 2018/0054394 A1 Feb. 22, 2018

(30) Foreign Application Priority Data
Mar. 20, 2015 (EP) .................................... 15305405

(51) Int. Cl.
*H04L 12/875* (2013.01)
*H04L 12/863* (2013.01)

(52) U.S. Cl.
CPC ........ *H04L 47/566* (2013.01); *H04L 47/6205* (2013.01); *H04L 47/6215* (2013.01); *H04L 47/6285* (2013.01)

(58) Field of Classification Search
CPC .............. H04L 47/566; H04L 47/6215; H04L 47/6205; H04L 47/6285
See application file for complete search history.

(56) References Cited

U.S. PATENT DOCUMENTS

| | | | |
|---|---|---|---|
| 6,912,225 B1 * | 6/2005 | Kohzuki | ................. H04L 47/10 370/236 |
| 2003/0219026 A1 * | 11/2003 | Sun | ......................... H04L 47/20 370/412 |

(Continued)

FOREIGN PATENT DOCUMENTS

| EP | 1054544 A2 | 11/2000 |
|---|---|---|
| EP | 1303083 A1 | 4/2003 |

(Continued)

OTHER PUBLICATIONS

International Search Report PCT/ISA/210 for International Application No. PCT/EP2016/055812 dated May 31, 2016.

(Continued)

*Primary Examiner* — Gary Mui
(74) *Attorney, Agent, or Firm* — Dinsmore & Shohl LLP

(57) ABSTRACT

Network device for transmitting packets having packet properties, including at least two input-output-buffers for queuing packets in the network device; a sojourn time calculator for calculating a sojourn related time for each head packet in the at least two input-output-buffers; a sojourn related time adaptor for, based on an adaptation function assigned to the corresponding input-output-buffer, adapting the sojourn related time into an adapted time for each head packet in the at least two input-output-buffers; and a scheduler for scheduling outgoing packets based on the adapted time.

9 Claims, 4 Drawing Sheets

(56) References Cited

U.S. PATENT DOCUMENTS

| | | | | |
|---|---|---|---|---|
| 2005/0100045 A1* | 5/2005 | Hunkeler | .......... | H04W 72/1231 370/465 |
| 2006/0039393 A1* | 2/2006 | Firoiu | .................... | H04L 47/50 370/412 |
| 2014/0211625 A1* | 7/2014 | White | .................... | H04L 69/16 370/235 |
| 2015/0288590 A1* | 10/2015 | Mason | ................ | H04L 67/1027 709/224 |
| 2016/0241484 A1* | 8/2016 | De Schepper | .......... | H04L 47/56 |

FOREIGN PATENT DOCUMENTS

| | | |
|---|---|---|
| WO | WO-20041051906 A2 | 6/2004 |
| WO | WO-2011/076239 A1 | 6/2011 |

OTHER PUBLICATIONS

Written Opinion of the International Searching Authority PCT/ISA/237 for International Application No. PCT/EP2016/055812 dated May 31, 2016.

* cited by examiner

SCHEDULING OF PACKETS IN NETWORK DEVICES

CROSS-REFERENCE TO RELATED APPLICATIONS

This application is a national phase under 35 U.S.C. § 371 of PCT International Application No. PCT/EP2016/055812 which has an International filing date of Mar. 17, 2016, which claims priority to European Application No. 15305405.1, filed Mar. 20, 2015, the entire contents of each of which are hereby incorporated by reference.

TECHNICAL FIELD

The present invention relates to scheduling of packages in network devices. More particularly, the invention relates to a scheduling mechanism optimized for priority and/or latency scheduling.

BACKGROUND

Currently pure priority scheduling is often combined with a rate limiter (policing or shaping) to guarantee minimal throughput for lower priority traffic. Also Weighted Round Robin is applied to guarantee a specific minimal rate to different traffic classes, but this does not guarantee a latency prioritization. Both systems cannot be used for greedy traffic which is driven by end-system congestion control like Transmission Control Protocol TCP without losing the low latency advantage (current TCPs create big queues).

Additionally, these solutions have fixed bandwidth limitations (in some cases as for weighted round robin, made relative to current link capacity if this fluctuates) and don't balance the weights over the classes according to the level of congestion (balance capacity to the number of flows that are active in each class).

Alternatively a shared or coupled active queue management AQM can be applied on both queues to balance the flow rates which steers the congestion control algorithm in the end-systems by sending correct mark/drop signals. TCP can be congested controlled by dropping or marking packets, but there stay per flow at least 1 or 2 packets in flight, due to minimum window in the congestion control of (dc)tcp; if all packets were marked, their window will not be reduced below 1 packet, meaning that at least 1 or 2 unacknowledged packets are always sent by tcp. If more packets are in flight than the bandwidth delay product, they will end up in the queue of the bottleneck link. So this is certainly the case if there are more TCP flows active than the bandwidth delay product. If pure priority scheduling is used, the priority class will continuously have packets in the queue and lower priority flows will starve.

It is an object of the present invention to provide a packet scheduling system that allows fair prioritization and/or latency without starving flows.

SUMMARY

To this end, the invention provides a network device for transmitting packets having packet properties, comprising:
at least two input-output-buffers for queuing packets in the network device;
a sojourn time calculator for calculating a sojourn related time for each head packet in the at least two input-output-buffers;
a sojourn related time adaptor for, based on an adaptation function assigned to the corresponding input-output-buffer, adapting said sojourn related time into an adapted time for each head packet in the at least two input-output-buffers;
a scheduler for scheduling outgoing packets based on the adapted time.

The network device of the invention is adapted to schedule packets over different queues depending on the sojourn related time of the first packet in that queue. Per queue a different adaptation function can be applied to this sojourn related time. The queue with the biggest adapted value can be scheduled. Thereby the adaptation function allows the prioritization to be implemented while scheduling based on adapted sojourn related time allows fair scheduling.

A lab test setup (using real residential gateways RGWs, Alcatel-Lucent ISAMs and Alcatel-Lucent Service Routers) showed that using a strict priority scheduler according to the prior art, it was possible to support only 15 parallel low latency flows on a 40 Mbit link with a base RTT of 8 ms (Bandwidth Delay Product is around 30 packets). If more flows are running in parallel, the non-prioritized flows get starved (priority queue is always full). If the base round trip time RTT is further reduced to for instance 4 ms (by disabling some mechanisms on the physical layer) only 8 low priority flows will be supported. Using the mechanism of the invention, there is no limitation on the minimal Base RTT, nor the number of flows.

Preferably, the network device further comprises a classifier to classify received packets into one of the at least two input-output buffers based on the packet properties. Thereby, packets can be prioritized by entering them into a predetermined buffer.

Preferably the scheduler is adapted for scheduling the header packet with the highest or lowest adapted time as next outgoing packet. Such determination of highest or lowest adapted time can be easily implemented in the scheduler such that the scheduler operates efficiently and fast. Furthermore, such determination of highest or lowest adapted time can be implemented when a large number of input-output buffers are present in the network device.

Preferably the sojourn time calculator and the sojourn related time adaptor are provided to periodically re-calculate the sojourn time and the adapted time for each head packet in the at least two input-output-buffers. By periodically re-calculating the sojourn time and the adapted time, the scheduler has up-to-date information allowing the scheduler to correctly schedule the outgoing packets.

Preferably, the sojourn related time is based on the time a packet resides in the network device. Thereby, preferably the classifier is provided to add a timestamp to the received packets when classifying the received packets, and wherein the sojourn time calculator is provided to subtract the timestamp from a further timestamp determined at the moment of calculation. Alternatively, instead of the classifier, a timestamp adding means is provided to add the timestamp to the received packets. Adding a timestamp upon entry into the buffer, and subtracting the time in the timestamp from the current time is an easy way to measure the sojourn time of the packets in the buffer. Such mechanism is independent of packet size, queue length, network congestion and other influences.

Preferably, the adaptation function comprises: adapted time $Ta = a \times Ts + b$, wherein $Ts$ is the sojourn time, and wherein a and b are predetermined first and second parameters defined for each of the at least two input-output-buffers. The first and second parameters are predetermined for each buffer of the at least one input-output buffers. Thereby, the priority mechanism can be predefined and designed. By calculating the adapted time, the scheduler can schedule outgoing packets based on the adapted time. In this context, it will be clear that alternatively any function, complex arithmetic operations or value mapping using a table can be used as adaptation function. Functions such as powers, exponential functions and log functions could be useful. The adaptation can also be done when enqueuing a packet. For instance the function Ta=Ts+b can be implemented by decrementing the enqueuing timestamp (=Te) by b, and the scheduler just can use the lowest timestamp without subtracting the current time (is the dequeuing time=Td, and Ts=Td−Te), as both Td can be eliminated when comparing both Ts times (and inverting the result due to the −Te). In case of a dual queue, the scheduler just needs to subtract both timestamps and schedule the packet from the first queue if the result is negative (or zero), otherwise the second. This is another embodiment of the present invention. Also with multiplications, there are possibilities to optimize. If for the first queue the adaptation function is Ta=(Ts+b)/a and for the second queue Ta=Ts, then at enqueuing of the second queue the following operation could be applied to the timestamp: Te=a·T+b (with T the current time). A second clock which could run (a−1) times faster (or the clock result T could be multiplied by (a−1)) could be subtracted extra from the 2 packet timestamp difference and again if the result is negative (or zero), the packet from the first queue will be scheduled. Both examples will reduce the dequeuing operations needed. In all embodiments, sojourn time is calculated, directly or indirectly, and an adaptation function is done, directly or indirectly so that all these embodiments are considered part of the present invention.

Preferably for at least one of the at least two input-output-buffers the first parameter a deviates from 1 and/or the second parameter b deviates from 0. Thereby a difference in priority is built in, which allows priority scheduling based on an amended sojourn related time.

The invention further relates to a method for scheduling packets in a network device for transmitting packets, wherein the method comprises the steps of:
calculating a sojourn related time for each head packet in the at least two input-output buffers;
adapting, based on an adaptation function assigned to the corresponding input-output buffer, said sojourn related time into an adapted time for each head packet in the at least two input-output buffers;
scheduling outgoing packets based on the adapted time.

The method describes the use of the network device according to the invention, which is described above. Therefore the advantages and effects described in relation to the network device equally apply to the method of the invention.

Preferably, the step of scheduling comprises selecting the header packet with the highest or lowest adapted time as next outgoing packet.

Preferably, at least one of the step of calculating and the step of adapting are periodically repeated to keep at least the adapted time up-to-date.

Preferably, the method further comprises adding a timestamp to each received packet upon classifying the packet in the buffers.

Preferably, the adaptation function is calculated so that adapted time Ta=a×Ts+b, wherein Ts is the sojourn related time, and wherein a and b are predetermined first and second parameters defined for each of the at least two input-output-buffers.

The invention further relates to a computer readable storage medium comprising instructions, which, when executed cause a data processing apparatus to carry out the steps of the method of the invention.

BRIEF DESCRIPTION OF THE FIGURES

Some embodiments of apparatus and/or methods in accordance with embodiments of the present invention are now described, by way of example only, and with reference to the accompanying drawings, in which.

DETAILED DESCRIPTION OF EMBODIMENTS

Figure 1:
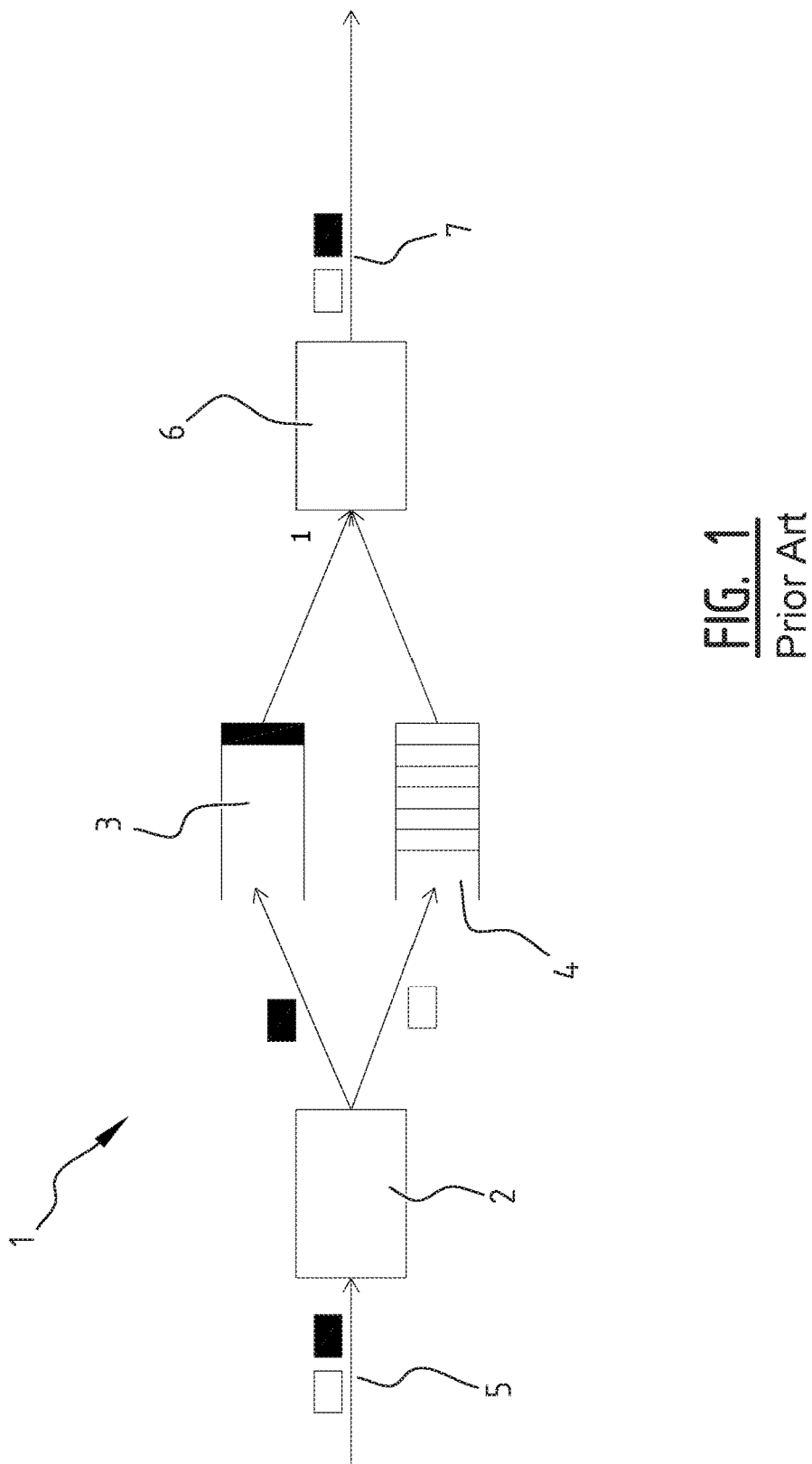
FIG. 1 illustrates a first priority scheduler according to the prior art.

FIG. 1 illustrates a prior art network device 1 with a classifier 2, a first input-output buffer 3 and a second input-output buffer 4, wherein the classifier classifies incoming packets 5 in the buffers 3, 4 based on packet properties. In the example of FIG. 1, buffer 3 is a priority buffer so that priority packages are classified into buffer 3 while other packets are classified into buffer 4. The scheduler 6 in FIG. 1 is a strict priority scheduler which prioritizes buffer 3 over buffer 4. In practice, if a packet is present in buffer 3, this packet will always be scheduled as next outgoing packet 7. As described above if the priority packet rate is too high and the priority queue cannot be emptied for a long time, this system might starve buffer 4 and non-priority packets.

Figure 2:
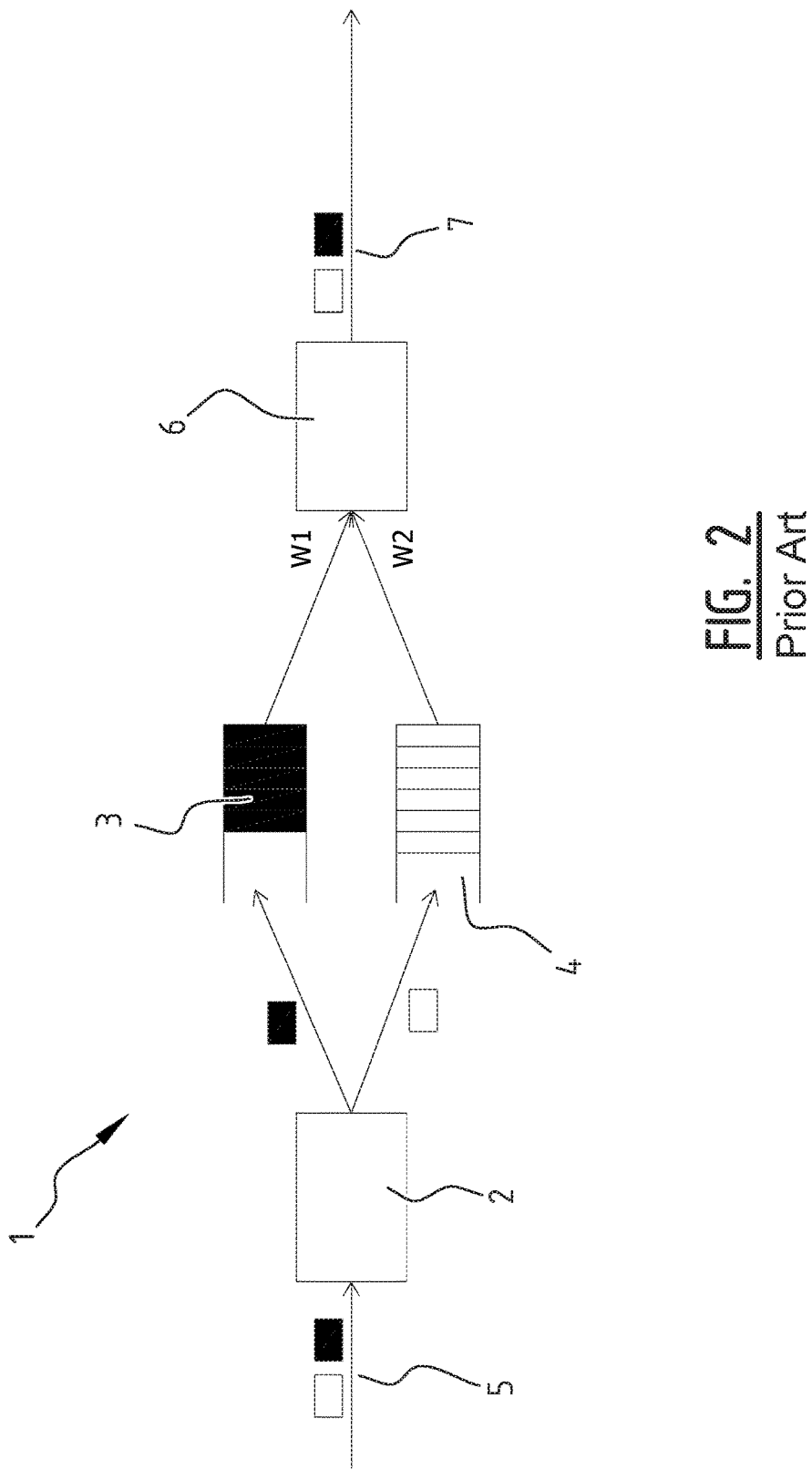
FIG. 2 illustrates a second priority scheduler according to the prior art.

FIG. 2 illustrates a prior art network device 1 that is similar to the network device 1 in FIG. 1. The scheduler 6 in FIG. 2 is a Weighted Round Robin scheduler which schedules packets according to a predetermined buffer order. For example, it might be configured to schedule, in cycles, 2 packets from buffer 4 and then 1 packet from buffer 3. Starvation is prevented, however no reduction in latency is provided.

Figure 3:
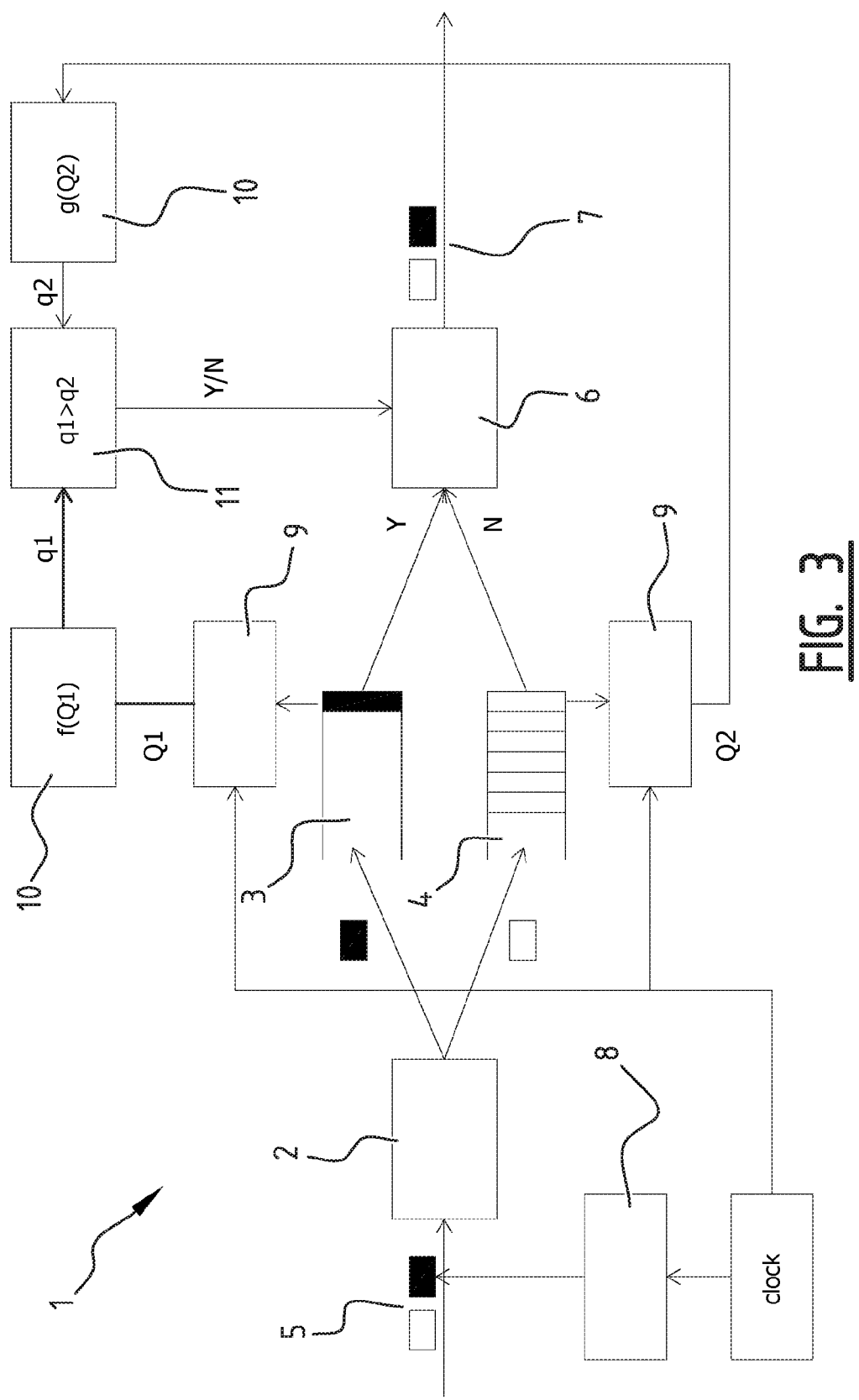
FIG. 3 illustrates a preferred embodiment of a scheduler according to the present invention.

In FIG. 3 a system 1 with 2 queues is depicted. When packets arrive 5 they receive a timestamp 8 (attached as additional info to the packet, based on the current time derived from a clock, preferably a monotonic clock), are classified 2 based on packet properties and are enqueued in one of the two FIFO queues 3, 4. The scheduler 6 is based on the sojourn time measurements done on the head packet of each queue. When a next packet can be send, the timestamp of the first packets is subtracted from the current time (received from the clock) and identified by Qi. This is the sojourn time and is illustrated in the figure by blocks 9. For each queue an adaptation function 10 can be defined (for instance q1=f(Q1)=Q1+50 ms and q2=g(Q2)=Q2>>3=Q2/8). Then the resulting qi values are compared and the packet in the queue with the highest value is selected for scheduling as next outgoing packet 7.

The adaptation function 10 can comprise a simple adaptation, for example to divide or multiply, optionally with a simple bit-shift operation, the value with a different number per queue, for example: q=Q<<3=Q*8, resulting in a FIFO-like queue with different queueing latency per queue, for example a ratio of 1 to 8. Also an offset can be added on some of the queues' sojourn time, for example: q=Q+10 ms, resulting in a guarantee to have at least the respectively offset amount of time, in the example 10 ms, less queuing delay for those queues compared to the others. Other functions are possible.

Figure 4:
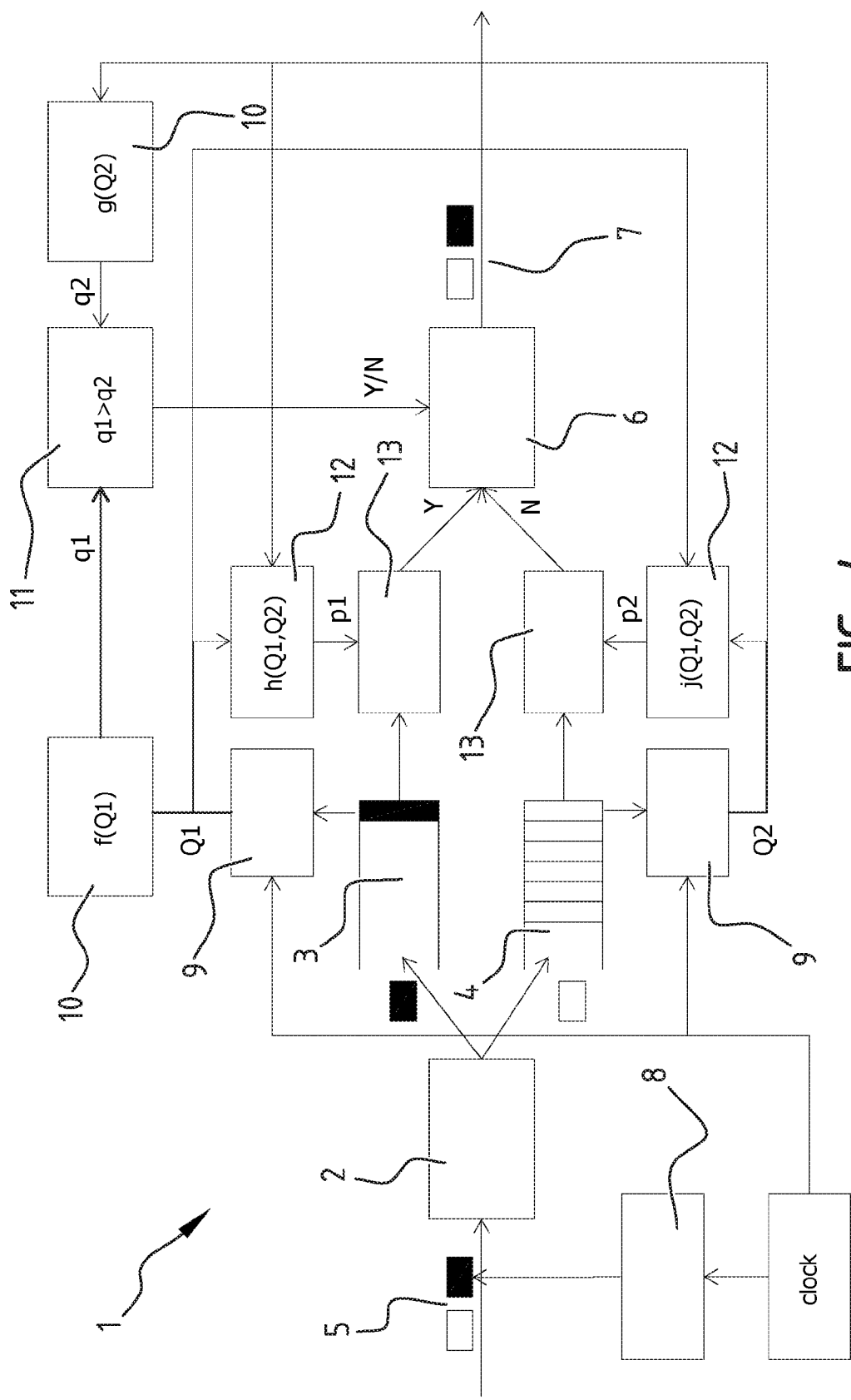
FIG. 4 illustrates a further preferred embodiment of a scheduler according to the present invention.

In FIG. 4 the embodiment of FIG. 3 is extended with a Coupled active queue management AQM. Here additionally the marking and dropping probability of the dequeued packet is calculated, as a function of some queuing property, in this case for instance also the sojourn time of both queues as illustrated by blocks 12. By applying a different function per queue the throughput rates can be corrected, for instance to TCP fairness. For TCP, if the ratio of RTTs, round trip time, partially dependent on the increased queuing time, of 2 classes is X, the throughput ratio of the 2 classes will be 1/X. If TCP reno is used, the throughput $r=1.22/(p^{(1/2)}*RTT)$, with p being the marking or dropping probability, and RTT the round trip time. To compensate a RTT ratio of X, a p ratio of $1/X^2$ is needed. Taking base RTT (RTT without queuing delays) into account, one can define the correct mapping of marking/dropping probabilities for each individual actual queue sojourn time. Marking/dropping is shown in the figure by blocks 13.

There is an alternative queuing delay measurement, instead of using the timestamps per packet, that is based on byte-wise queue size and a throughput estimator. This or any other alternative implementation can also be used as a mechanism to determine the duration of a packet in a queue.

A priority in terms of latency can be assigned to different types of traffic without the risk of starving the other traffic. The same is not possible by using for instance byte sized queue time. If only one packet is send in one queue, the byte size (if smaller than the threshold) will be always stay smaller, while the sojourn time is always increasing while not being scheduled, and will finally hit the threshold for scheduling.

Another advantage of the invention compared to other schedulers, is that the level of congestion can be balanced without the need to take the scheduling rates of the different queues into account. The delay is a function of both the scheduling rate and the size of the packets that were in the queue before it. In this way the delay can be balanced per flow, independent of both the number of flows in that traffic class and the scheduling rate of that traffic class. Compared with weighted round robin, the scheduling rate/weight is constant per class, independent of the congestion level in each class, and compared to priority scheduling the delay of the second class is the delay of the sum of the delay in both classes. If the first priority class is congested, the second priority class will starve, which is not the case in the present invention.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the FIGs., including any functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the FIGS. are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The invention claimed is:

1. Network device for transmitting packets having packet properties, comprising:
    at least two input-output-buffers for queuing packets in the network device;
    a sojourn time calculator for calculating a sojourn related time, based on the time a packet resides in the network device, for each head packet in the at least two input-output-buffers;
    a sojourn related time adaptor for, based on an adaptation function assigned to the corresponding input-output-buffer, adapting said sojourn related time into an adapted time for each head packet in the at least two input-output-buffers;
    a scheduler for scheduling outgoing packets based on the adapted time, wherein the scheduler is adapted for scheduling the head packet with the highest or lowest adapted time as next outgoing packet,
    wherein the adaptation function comprises a formula ($Ta=a \times Ts+b$), wherein Ta is the adapted time, wherein Ts is the sojourn time, and wherein a and b are predetermined first and second parameters defined for each of the at least two input-output-buffers.

2. Network device according to claim 1, wherein the network device further comprises a classifier to classify received packets into one of the at least two input-output buffers based on the packet properties.

3. Network device according to claim 1, wherein the sojourn time calculator and the sojourn related time adaptor are provided to periodically re-calculate at least the adapted time for each head packet in the at least two input-output-buffers.

4. Network device according to claim 3, wherein the network device further comprises a timestamp adding means to add a timestamp to the received packets when classifying the received packets, and wherein the sojourn time calculator is provided to subtract the timestamp from a further timestamp determined at the moment of calculation.

5. Network device according to claim 1, wherein for at least one of the at least two input-output-buffers the first parameter a deviates from 1 and/or the second parameter b deviates from 0.

6. Method for scheduling packets in a network device for transmitting packets, wherein the method comprises:
   calculating a sojourn related time, based on the time a packet resides in the network device, for each head packet in the at least two input-output buffers
   adapting, based on an adaptation function assigned to the corresponding input-output buffer, said sojourn related time into an adapted time for each head packet in the at least two input-output buffers;
   scheduling outgoing packets based on the adapted time, wherein the step of scheduling comprises selecting the head packet with the highest or lowest adapted time as next outgoing packet,
   wherein the adaptation function is calculated using a formula ($T_a = a \times T_s + b$), wherein $T_a$ is the adapted time, $T_s$ is the sojourn related time, and wherein a and b are predetermined first and second parameters defined for each of the at least two input-output-buffers.

7. Method according to claim 6, wherein at least one of the calculating and the adapting are periodically repeated to keep at least the adapted time up-to-date.

8. Method according to claim 6, wherein the method further comprises adding a timestamp to each received packet upon classifying the packet in the buffers.

9. A non-transitory computer readable storage medium comprising instructions, which, when executed cause a data processing apparatus to carry out the steps of the method of claim 6.

* * * * *